No. 665,346. Patented Jan. 1, 1901.
R. C. REED.
FILTER.
(Application filed May 19, 1900.)
(No Model.) 2 Sheets—Sheet 1.
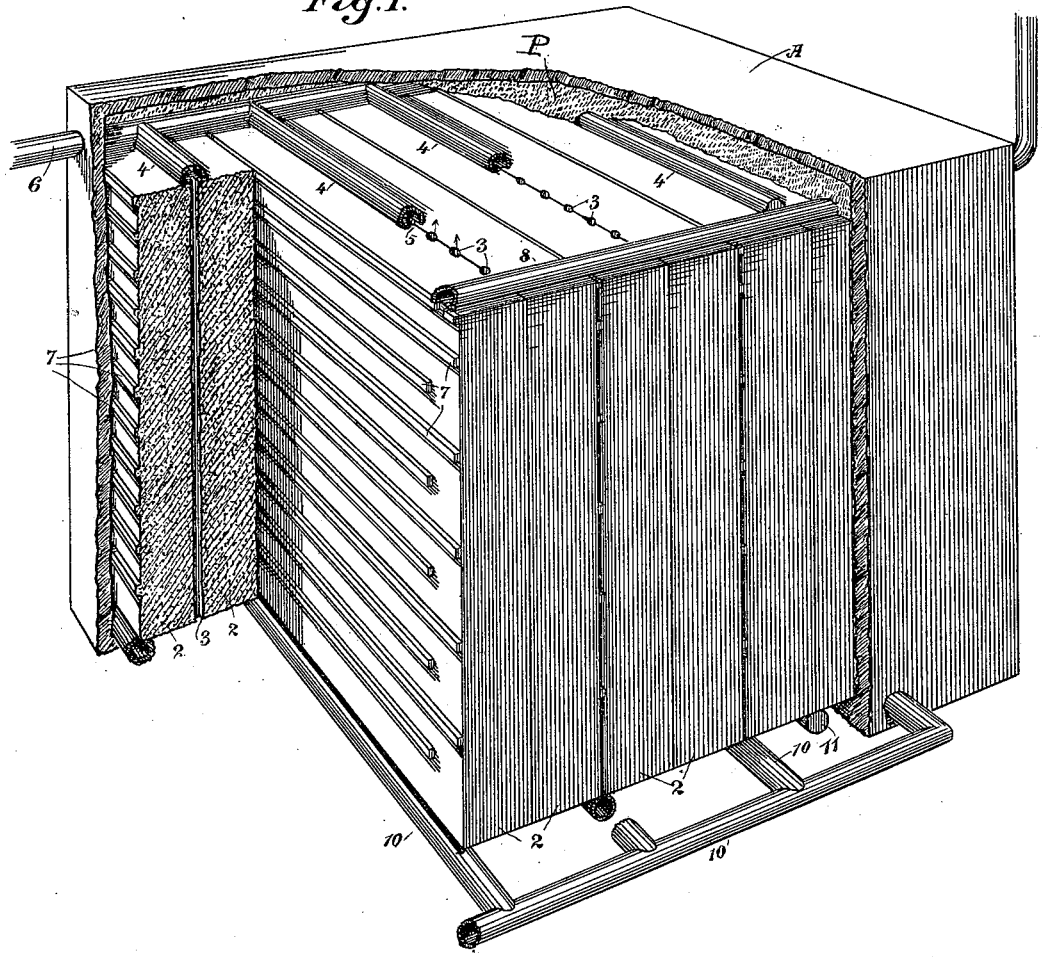
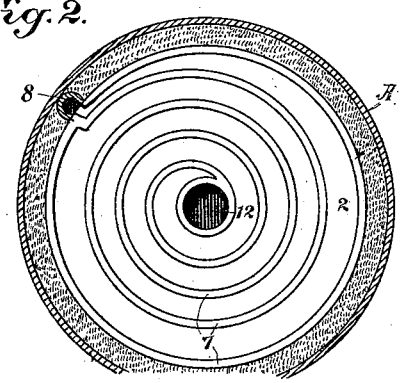
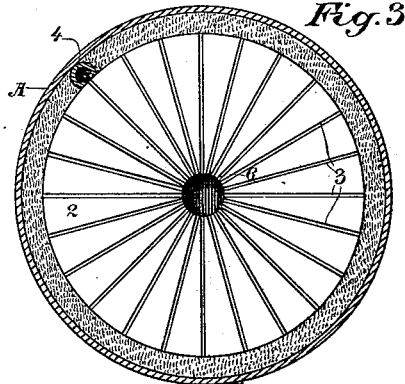
Witnesses,
Inventor,
Rudolph C. Reed No. 665,346. Patented Jan. 1, 1901.
R. C. REED.
FILTER.
(Application filed May 19, 1900.)

(No Model.) 2 Sheets—Sheet 2.

Witnesses,
Inventor,
Rudolph C. Reed
By Dewey Strong & Co.
Attys

UNITED STATES PATENT OFFICE.

RUDOLPH C. REED, OF SAN FRANCISCO, CALIFORNIA, ASSIGNOR OF THREE-FOURTHS TO HERMANN ZADIG AND H. M. LEVY, OF SAME PLACE, AND SOLOMON HIRSCH, OF PORTLAND, OREGON.

FILTER.

SPECIFICATION forming part of Letters Patent No. 665,346, dated January 1, 1901.

Application filed May 19, 1900. Serial No. 17,232. (No model.)

*To all whom it may concern:*

Be it known that I, RUDOLPH C. REED, a citizen of the United States, residing in the city and county of San Francisco, in the State of California, have invented an Improvement in Filters; and I hereby declare the following to be a full, clear, and exact description of the same.

My invention relates to filters and apparatus of that class which is designed to purify water and other liquids.

It consists of filtering-plates disposed in pairs, with grooves or channels in contiguous faces of each pair, in which the filtered water is collected and by which it is conducted to points of discharge. The opposite faces of the filter-blocks are provided with a series of ribs so disposed that channels are formed through which the liquid to be filtered passes from the inlet and is thus brought in contact with the whole exterior surfaces of the filter-blocks under such pressure as will cause the clear liquid to pass into the interior and to the conducting-channels before mentioned. Suitable passages are arranged for the supply of water to the exterior channels and to conduct the filtered water to a suitable point of delivery.

My invention also comprises details of construction, which will be more fully described by reference to the accompanying drawings, in which—

Figure 4:
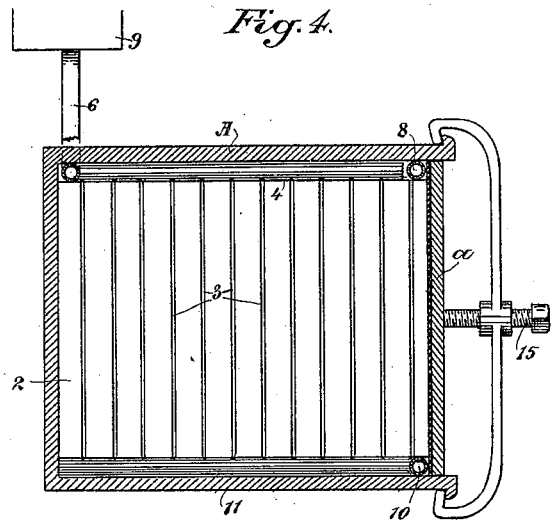
Figure 5:
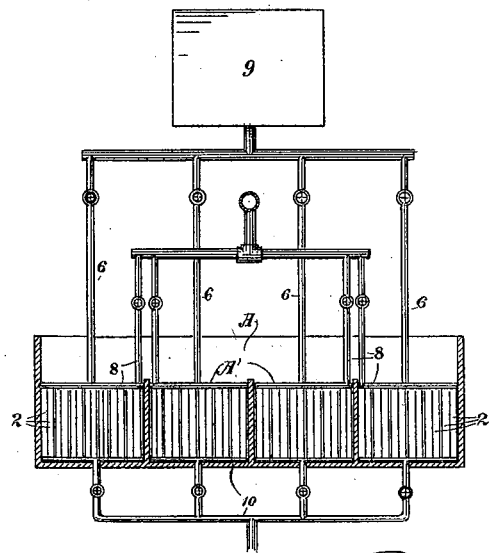

Figure 1 is a view of the filter. Figs. 2 and 3 show the construction when circular filter-plates are used. Fig. 4 is a longitudinal section showing one side of the case removable. Fig. 5 shows the arrangement when used on a larger scale.

In the construction of my filter I employ an exterior containing-case A, which may be rectangular, cylindrical, or of other shape, corresponding approximately with the shape of the filter-plates 2. These plates are made of any suitable filtering material—such as infusorial earth or the like—properly shaped and compacted or baked, so that they form sufficiently hard but porous filtering-surfaces, or any character of filtering-stone. When these plates are made rectangular, as shown in Fig. 1, they have made upon one of their surfaces grooves or channels 3, extending from end to end of the plate, so that channels are formed in either one or both of these contiguous faces to receive the water which passes through the filter-plates from the outside and to conduct it to a point of delivery at top or bottom. As here shown, the water is delivered upwardly, and along the upper meeting-lines of the filter-plates are arranged conductors 4. These conductors may be semitubular, so as to present an open slot 5 at the lower side, and this slot coincides with the contiguous edges of the filter-plates 2, so that the channels or passages 3 will discharge into the slots, and the water thus collected will be conveyed by the pipes 4 and delivered into a single conducting-pipe 6, by which it is carried to any suitable point where it is desired to discharge or collect the water.

Upon the exterior faces of the filter-plates or opposite to those which contain the channels 3 are formed ribs 7, and these ribs, contacting with the next adjacent filter-plates or with corresponding ribs thereon, form open channels into which the unfiltered water is delivered. These ribs extend from the side of the filter-case alternately to a short distance from the opposite side, so as to form a tortuous channel through which the water passes. Water is delivered into these channels by means of pipes 8, extending transversely across the top of the filter-case of the filter, and water is received into this pipe under a considerable head or pressure, which is sufficient, when the water is confined between the filter-plates, to cause it to pass through the porous surfaces to the interior channels 3. This pressure may be of any desired or available power. If, for instance, a pressure of forty pounds be available, the filtered water may be delivered through the pipe 6 into a tank 9, forming an air-chamber to provide for an elastic pressure of water within the tank, or the pressure within this tank may depend upon its elevation, so that there may be as much as twelve or fifteen pounds back pressure from the tank. This pressure becomes available for washing out the filter-surface by a reverse flow from the tank into the space between the channels 3, thence outwardly through the filter-plates into the open spaces between the ribs 7, and thence to the discharge, which connects with the lower part of the spaces between the rib 7 by means of slotted tubes 10 or like conducting-passages, through which the water may be allowed to flow freely from the source of supply 8. When it is desired to wash off accumulations from the outer surfaces of the filter-plates and while the water is thus flowing freely, not being under much pressure in the spaces between the ribs 7, the pressure from the tank 9 will act to force filtered water out through the filtering-plates and thus cleanse them.

When it is desired to wash out the space between the contiguous plates in which are the channels 3, it may be done by means of a slotted pipe 11, connecting at the bottom with these channels or spaces in the same manner that the previously-described pipes connect, so that by opening a discharge through this pipe the filtered water will pass down through the channels and between the faces of the filter-plates and thus wash them out.

I have hitherto described the apparatus as being formed with rectangular filter-plates; but it will be understood that these plates may be made circular or of some equivalent shape, when the ribs 7, between which the water is first admitted, will be arranged spirally, the water being admitted at the outside and discharged through a central opening, as at 12. The channels 3 would in such case be disposed radially from the center toward the circumference and discharged outwardly into a pipe 4, properly disposed to receive the discharge, the operation being in all respects similar to that previously described.

In setting up the apparatus the plates are fitted into their case with a suitable packing of cement P, which holds them solidly and makes tight joints around the plates, the cement being less porous than the plates. The various pipes 4, 8, and 10 are also fitted to the corresponding connecting grooves or channels by being embedded in the cement.

If it is desired to so construct the apparatus that access may be had to the supply-chambers between the filter-plates, one side of the case may be made removable, as shown at $a$, and fitted with gaskets or like devices to form tight joints against the edges of the plates and the case. The removable side may be secured by a yoke and screw, as at 15, or by bolts or other suitable device.

For large apparatus the filter-plates may be disposed in groups in separate chambers A', the supply-pipes 8 diverging thereto from a source of supply, and if under pressure the water is delivered, as previously described, to a pressure-tank 9. If not under pressure, the discharge-pipes may be extended downwardly and connected, so as to produce a vacuum by the weight of the water.

It will be understood that the water-supply to the filter and the course of the water through the same are controlled by some well-known form of valve connections—such, for instance, as shown in Fig. 5.

Having thus described my invention, what I claim as new, and desire to secure by Letters Patent, is—

1. A filter consisting of porous plates having contiguous channeled surfaces between meeting faces of pairs of plates and corresponding open channels, with directing-ribs between the other faces of said plates.

2. A filter consisting of a series of porous filtering-plates, having the contiguous faces of each pair of plates formed with channels into which the filtered water is received, slotted collecting-pipes extending transversely across the ends of said channels and ribs between the opposite faces of the filter-plates forming tortuous or spiral channels for the flow of water, and pipes by which water is delivered into said passages under pressure.

3. The combination in a filter of a series of filtering-plates arranged in pairs with channels between the contiguous faces of each pair to receive water, and ribs forming tortuous channels between the opposite faces of said pairs, a casing within which said plates are fitted, a body of cement inclosing and surrounding the plates, slotted discharge-pipes connecting with the filtered water, channels and supply-pipes through which water under pressure is delivered into the tortuous channels between the plates.

4. The combination in a filter of a series of porous filter-plates having collecting-channels in their contiguous faces, and ribs forming tortuous channels between the opposite faces of each pair, a packing by which tight joints are formed around the edges of said plates, conducting-pipes adapted to receive the filtered water from the collecting-channels, an air-chamber tank into which said water is delivered under pressure, supply-pipes through which water to be filtered is delivered into the spaces containing the tortuous channels and means for discharging the water freely from said spaces whereby a current is produced to wash and cleanse the exterior filter-surfaces.

5. The combination in a filter of a series of porous filtering-plates, disposed in pairs with interspaces to receive the filtered water, and conductors therefor, channels through which unfiltered water is supplied exterior to the filter-plates, to flow over the surfaces, and to wash them, a containing-case for the apparatus, and a detachable side by the removal of which access may be had to the supply and directing channels.

In witness whereof I have hereunto set my hand.

RUDOLPH C. REED.

Witnesses:
S. H. NOURSE,
JESSIE C. BRODIE.